Dec. 13, 1932.   W. H. FREYGANG   1,891,045
SAFETY DISK CUTTER
Filed July 7, 1930
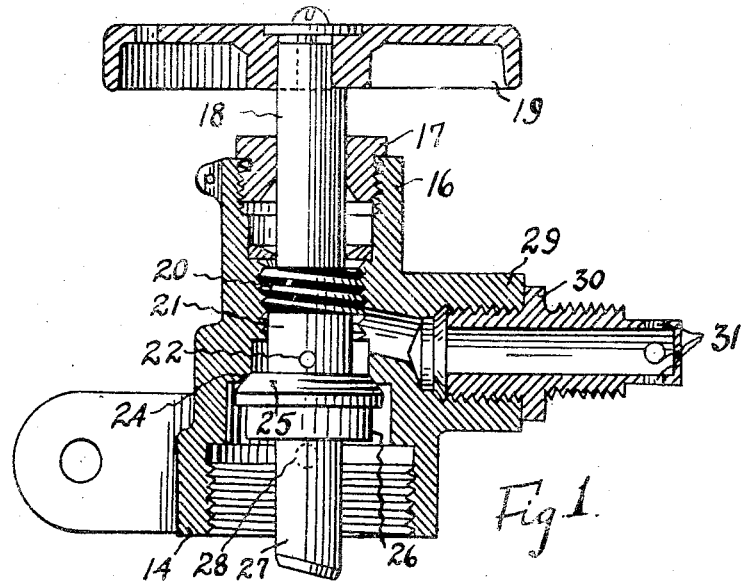
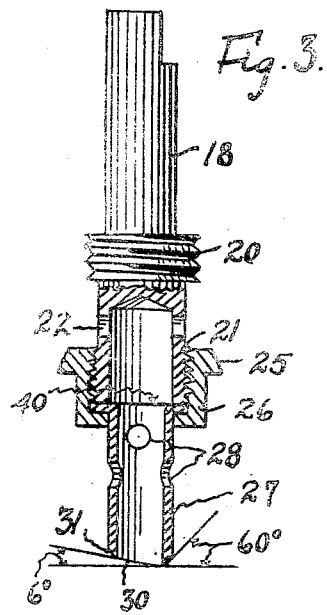
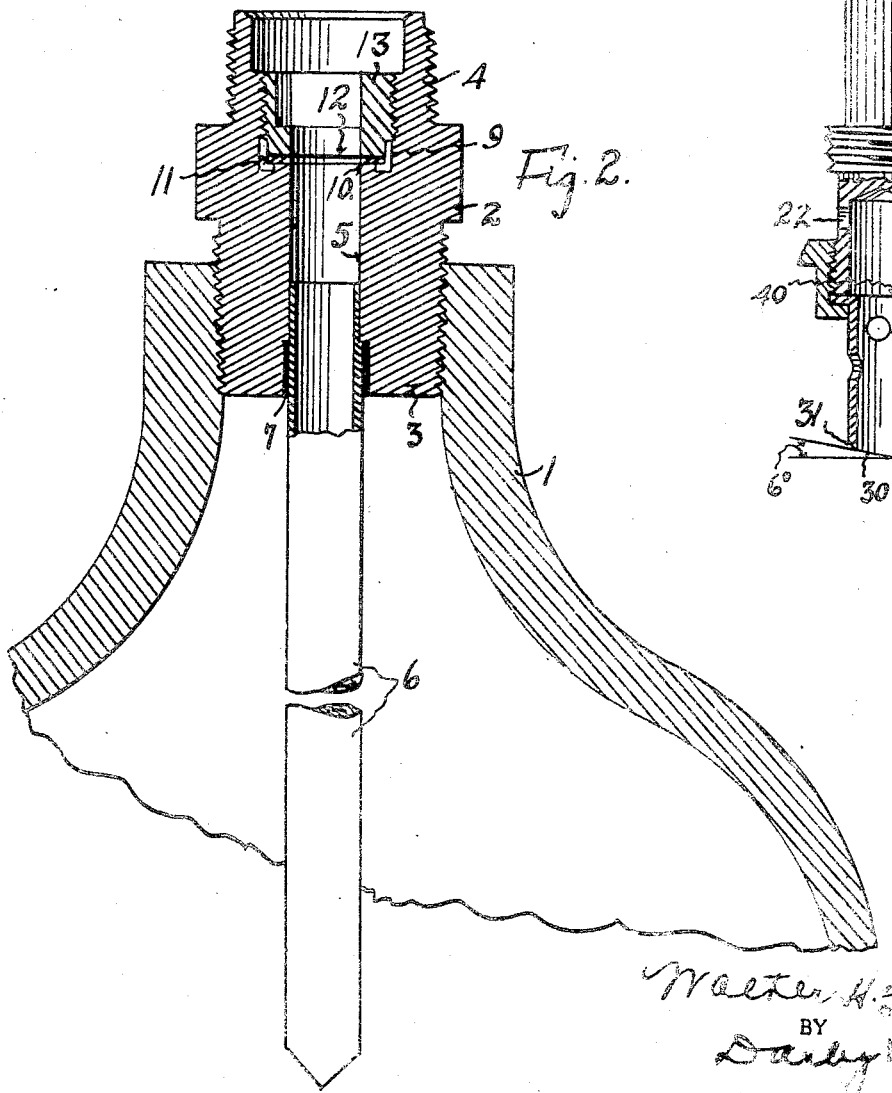
INVENTOR
Walter H. Freygang
BY
Darby & Darby
ATTORNEYS Patented Dec. 13, 1932

1,891,045

UNITED STATES PATENT OFFICE

WALTER HENRY FREYGANG, OF WEEHAWKEN, NEW JERSEY, ASSIGNOR TO WALTER KIDDE & COMPANY, INC., A CORPORATION OF NEW YORK

SAFETY DISK CUTTER

Application filed July 7, 1930. Serial No. 466,056.

This invention relates in general to improvements in a cutter for cutting out the safety disk used in connection with gases and liquids under high pressures, such as carbon dioxid.

One of the objects of this invention is the provision of an improved form of safety disk cutter so constructed as to insure that the disk will be completely cut out when the cutter is operated.

A further object of this invention is the provision of a hollow tubular cutter having a cutting edge which lies in a plane at an angle with the longitudinal axis of the cutter.

A further object of this invention is the provision of a hollow cutter constructed so as to facilitate the passing of the cut out portion of the safety disk up inside of the cutter out of the path of flow of the released medium.

A further object of this invention is the provision of a cutter of this type which accomplishes a cutting action in a manner which will not give a false indication of the operation thereof.

A still further object of this invention is to provide a hollow tubular cutter of the general nature of that shown in United States Patent No. 1,674,427 but having improved features with regard to the cutting edge.

A still further object of the invention is the provision in a cutter of this type of a cutting edge which will completely uniformly cut out the central portion of a frangible safety disk so as to leave a clear full opening through the disk.

A further object of this invention is the provision in a hollow cutter of this nature of a cutting edge on the inside diameter of the hollow cutter.

A still further object of this invention is the provision of a combination of a high pressure container, a valve therefor in communication with the container, a frangible safety disk in the path of communication, and a cutter operating in conjunction with the valve for completely and rapidly cutting out the safety disk when it is desired to put the apparatus in operation.

These and many other objects, as will appear from the following disclosure, are secured by means of this invention.

This invention resides substantially in the combination, construction, arrangement and relative location of parts, all as will be described below.

Referring to the drawing—

Figure 1 is a vertical cross sectional view through the combined control valve and cutter device;

Fig. 2 is a vertical cross sectional view through the high pressure medium container and the coupling device to which the valve of Fig. 1 is secured showing a frangible safety disk in place; and Fig. 3 is a side elevational view partly in longitudinal cross section of the cutter element and the valve.

As is well known in this art, it is usual to store carbon dioxid under liquefying pressures at ordinary temperatures within heavy sealed containers. These containers are provided with control valves through which the carbon dioxid is delivered from the container under control. It is usual to connect in the delivery passage from the bottle at some convenient point a frangible safety disk which is constructed so as to be ruptured if the pressure within the container exceeds a predetermined value. When it is desired to put such a container in use, assuming that it is fully charged and the safety disk has not been ruptured, it is usual now to employ some form of cutting arrangement for cutting out the disk to release the medium within the container. The present invention is directed to highly important features of improvement in such cutters. In addition, the improved cutter of this invention has been shown in combination with a control valve arranged so that if the safety disk bursts under excess pressure the liquid may escape beyond the valve. In addition, the valve is so constructed that as it is opened the cutter moves downwardly into contact with the safety disk to cut it out. The advantages of this construction will be described in detail in connection with the description of the device.

Referring to the drawing, the gas or liquid container or bottle is shown at 1 with an opening at the top which is internally threaded. At 2 is a connecting nipple having reduced portions at 3 and 4 which are externally threaded. The threaded end 3 engages the threads of the container 1 to effect connection between the container and the coupling member 2. The coupling member 2 is shown provided with a bore 5 extending therethrough in which is secured in any suitable manner, such as by soldering, at 7 a hollow tube 6 which, in the usual practice, extends down to a point near the bottom of the container. This tube is known as a siphon type and insures, in the case where the container has for example a liquefying gas therein, the delivery of liquid from the container. The coupling member 2 is counterbored, as shown at 9, which counterbore has a portion of smaller diameter intermediate the ends of the coupling, which portion is internally threaded. An annular recess is also cut into the end of this counterbore to provide a seat 10 on which rests a suitable washer 11 against which end portion rests the frangible safety disk 12 held in place by means of the externally threaded hollow block 13. The frangible disk 12 is usually of any material which is strong enough to resist a desired pressure and is made usually of thin material so that it will readily rupture when that predetermined pressure has been exceeded. At 14 is shown a valve bonnet or cap which has a passage extending therethrough of various diameters. This passage is internally threaded at the lower end of the valve bonnet, as shown, which threads engage the external threads on the portion 4 of the coupling member 2. The valve bonnet is formed to provide the projection 16, which is internally threaded, to receive a packing nut 17. Extending through the bonnet and nut 17 is the valve stem 18 which is provided at its upper end with a hand wheel or lever 19. Intermediate the ends of the valve stem 18 is an enlarged threaded portion which engages cooperating threads on the interior of the valve bonnet. The lower end 21 of the valve stem is slightly enlarged and is recessed, as clearly shown in Fig. 3. The lower end of the valve stem is provided with external threads, as shown, to receive a combined coupling member and valve seat 26. This coupling member is provided with a seat at 25. This seat engages with a beveled seat 24 formed in the interior of the valve bonnet. Coupled to the lower end of the valve stem by means of the coupling member 26 is a hollow tubular cutter 27. The upper end of this tubular cutter is flanged as shown in Fig. 3. The recessed lower end of the valve stem 18 is provided with openings 22 and the hollow cutter is provided with openings 28. The valve bonnet is also provided with a hollow projection 29 which opens to the interior of the valve at one end and which is internally threaded at the other end to receive a coupling member 30 which is closed on its projecting end and provided with a series of openings 31.

When the parts shown in Figs. 1 and 2 are in operative relation, the valve bonnet is secured to the coupling member 2 by means of the threads shown. When the valve is in the position shown in Fig. 1 the delivery passage to coupling member 30 is closed by reason of the resting of the valve surface 25 on the seat 24. When it is desired to put the device in operation valve stem 18 is rotated by means of the wheel 19. As a result the valve stem and its attached cutter descend causing valve 25 to leave its seat 24. At the same time the lower cutting edge of the hollow tubular cutter 27 descends against and through the frangible disk 22 completely cutting it out permitting escape of the medium from the container around the unseated valve into the hollow connection 30 and thence to a hose or pipe connected thereto.

One of the prime features of novelty in this case is the particular form of cutting edge on the hollow tubular member 27. As clearly shown in Fig. 3, the lower end of the tubular member is cut off at a slight angle with respect to a plane at right angles to the longitudinal axis of the cutter. This angle has been shown illustratively as of the order of about 6° to provide the inclined cutting edge 30. It is to be strictly understood, however, that the advantages of this invention may be secured with a cutting edge lying at a lesser or greater angle than 6°.

Likewise, the outer lower edge of the hollow cutter is cut at an angle extending towards the internal diameter of the hollow cutter to provide a cutting edge on the internal diameter of the cutter. This beveled edge has been shown as lying in a plane at about 60° with respect to the plane at right angles to the longitudinal axis of the cutter. Likewise, it is pointed out that this angle is given in an illustrative sense since this is not a critical value, the main feature being to provide a cutting edge at the internal diameter of the hollow tubular cutter.

With an arrangement of this type after the entering edge of the cutter engages the safety disk it takes but little further movement of the cutter to effect complete engagement of the cutting edge with the disk resulting in a quick removal of the center of the safety disk. Heretofore relatively large angles have been used for this cutting edge or a so-called saw tooth cutter has been employed with the result that after the first piercing of the disk the escaping medium produces a sound which misleads the operator to believe that the disk has been cut out which is often not the case.

For the efficient operation of apparatus of this type it is highly important that the disk be completely cut out so that free passage may be had for the medium. If the disk is merely pierced with small openings the rapidly escaping medium under high pressure cools due to the expansion of the medium as it passes through the small holes causing a solidification of the medium in the openings and interfering with the correct operation of the device. By having the cutting edge at a relatively small angle as shown it takes relatively small movement of the cutter to effect complete cutting out of the disk so that the operator will not stop the cutting operation before it is completed. By beveling the edge of the cutter as shown at 31 to place the cutting edge on the internal diameter of the cutter the disk which is cut out is of approximately the same diameter as the internal diameter of the cutter so that the pressure of the medium blows it up into the hollow cutter to a point where it will not interfere with the correct action of the apparatus. If the cutting edge is at the outer diameter of the cutter or at a point between the outer diameter and the inner diameter it is necessary for the cut out portion of the disk to buckle and crimp before it can be forced up into the cutter. In practice this does not often occur and as a result the cut out portion of the disk sticks on the end of the cutter. This is particularly true where the cutting edge is in the plane at right angles to the longitudinal axis of the cutter.

It will be apparent, therefore, that the beveled cutting edge indicated at 60° is in no sense a critical angle since any angle which will put the cutting edge on the inner diameter of the cutter is sufficient. The other angle is, however, more critical depending upon how rapidly it is desired to cut out the center of the safety disk. The speed of removal of this safety disk is dependent upon the angle indicated by the symbol 6° and the size of this angle will, of course, vary depending upon how rapidly it is desired to cut out the disk. As already pointed out, the more quickly it is cut out the less liability there is for the operator to be misled by hearing the rush of medium from the container and hence stop the cutting action.

If when valve 25 is seated the safety disk 12 should be ruptured by excess pressure, the auxiliary safety disk 40 shown in Fig. 3 between the hollow cutter and the passage in the valve stem will also rupture and the medium can escape through the hollow cutter and holes 22 to and through the coupling 30, giving an audible indication that this has occurred.

From the foregoing disclosure the features of construction and function of the parts will be readily understood. It will be apparent to those skilled in the art that the principles of construction and operation by means of which the advantages of this invention are secured may be embodied in many physical forms without departing from these principles. I do not desire, therefore, to be strictly limited to the disclosure as given for purposes of illustration but rather to the scope of the appended claims.

What I seek to secure by United States Letters Patent is:

1. In a safety disk cutter of the type described, the combination comprising a hollow tubular member having a cutting edge lying at a small angle with respect to a plane at right angles to the longitudinal axis of the tubular member, said cutting edge being on the inner diameter of the tubular member.

2. In a safety disk cutter of the type described, the combination comprising a hollow tubular member having a cutting edge lying at a small angle with respect to a plane at right angles to the longitudinal axis of the tubular member, said cutting edge being on the inner diameter of the tubular member and formed by beveling the external edge of the tubular member.

3. In a safety disk device of the type described, a hollow tubular member provided with a cutting edge lying within the external diameter of the tubular member and in a plane which is at a small angle with a plane at right angles to the longitudinal axis of the tubular member.

4. A construction of the type described comprising a valve stem, a hollow tubular cutter having a cutting edge lying at a small angle with the longitudinal axis thereof, and means for uniting the valve stem and hollow tubular cutter together.

5. A valve bonnet of the type described having a valve stem longitudinally movable therein, the lower end of the valve stem being recessed and having holes in the wall thereof, a hollow tubular cutter, and means for securing a cutter to the recessed end of the valve stem so that the recess is in free alignment with the hollow cutter, said hollow cutter having a cutting edge on the internal diameter thereof lying at a small angle with respect to a transverse plane through the hollow cutter.

6. A cutter device of the type described comprising a hollow tubular member beveled at its outer lower end to provide a cutting edge on the internal diameter of the tubular member, the cutting edge lying at a small angle with the longitudinal axis of the tubular member.

7. The combination with a valve body having a passage therein closed by a frangible safety disk normally exposed to fluid pressure when in use, of a movable valve stem, and a hollow member secured to the valve stem, said valve stem and hollow member being movable towards the safety disk at the side opposite to that exposed to fluid pressure, said hollow member having a cutting edge lying at a small angle with respect to a transverse plane through the hollow member, whereby the hollow member when moved against the frangible disk will completely cut the center thereof out with a relatively small movement of the cutter so that the gas pressure will force the piece of the disk cut-out up into the hollow cutter member.

In testimony whereof I have hereunto set my hand on this 12th day of June, A. D. 1930.

WALTER HENRY FREYGANG.